(12) United States Patent
Takahashi

(10) Patent No.: US 7,063,200 B2
(45) Date of Patent: Jun. 20, 2006

(54) PULSATION DAMPENING APPARATUS AND CLUTCH MASTER CYLINDER

(75) Inventor: Koji Takahashi, Yokosuka (JP)

(73) Assignee: Nabco, Ltd. (JP)

( * ) Notice: Subject to any disclaimer, the term of this patent is extended or adjusted under 35 U.S.C. 154(b) by 41 days.

(21) Appl. No.: 10/795,820

(22) Filed: Mar. 8, 2004

(65) Prior Publication Data

US 2004/0178038 A1    Sep. 16, 2004

(30) Foreign Application Priority Data

Mar. 14, 2003    (JP)    ............... 2003-070166

(51) Int. Cl.
 F16D 25/08    (2006.01)
 F16D 25/11    (2006.01)
 B60T 11/16    (2006.01)
 F16L 55/04    (2006.01)

(52) U.S. Cl. ............ 192/109 F; 60/469; 60/592; 92/60; 192/30 V

(58) Field of Classification Search ............ 192/109 F, 192/109 D, 30 V; 60/469, 592; 92/60; 220/319; 411/518; 138/31
See application file for complete search history.

(56) References Cited

U.S. PATENT DOCUMENTS

| | | | |
|---|---|---|---|
| 2,544,631 A * | 3/1951 | Brozek et al. | ............... 411/518 |
| 2,552,166 A * | 5/1951 | Gardiner | ...................... 411/518 |
| 2,595,787 A * | 5/1952 | Heimann | ..................... 411/518 |
| 4,301,908 A | 11/1981 | Fukuda et al. | |
| 5,070,983 A * | 12/1991 | Leigh-Monstevens et al. | ....................... 192/109 F |
| 5,540,486 A * | 7/1996 | Linkner | ........................ 138/30 |
| 5,816,046 A | 10/1998 | Paeth et al. | |
| 6,101,811 A * | 8/2000 | Nix et al. | ...................... 60/469 |
| 6,148,614 A * | 11/2000 | Nix et al. | ................ 192/109 F |
| 6,789,388 B1 * | 9/2004 | Leigh-Monstevens et al. | .......................... 60/592 |

FOREIGN PATENT DOCUMENTS

| | | | | |
|---|---|---|---|---|
| FR | 2 762 662 | | | 10/1998 |
| JP | 3-14581 | | | 1/1991 |
| JP | 8-4787 | | | 1/1996 |
| JP | 8-80834 | A | * | 3/1996 |
| JP | 8-119089 | | | 5/1996 |
| JP | 8-320031 | A | * | 12/1996 |
| JP | 9-4656 | A | * | 1/1997 |
| JP | 2000-2270 | | | 1/2000 |

* cited by examiner

Primary Examiner—Rodney H. Bonck
(74) Attorney, Agent, or Firm—Gerald E. Hespos; Anthony J. Casella

(57) ABSTRACT

A pulsation dampening apparatus and a clutch master cylinder used for a hydraulic clutch operation system which has a hydraulic circuit. The apparatus has a housing which has a dampening chamber in the hydraulic circuit and a dampening assembly accommodated in the housing. The dampening assembly includes a working unit which dampens pulsations generated in the dampening chamber in the hydraulic circuit, an elastic retainer preloaded between the housing and the working unit to fasten the working unit into the housing by exerting a reaction force onto the working unit, and a force conversion mechanism which increases the reaction force of the elastic retainer in accordance with an urging force transmitted from the working unit to the elastic retainer.

16 Claims, 11 Drawing Sheets

PULSATION DAMPENING APPARATUS AND CLUTCH MASTER CYLINDER

BACKGROUND OF THE INVENTION

1. Field of the Invention

The present invention relates to a pulsation dampening apparatus and a clutch master cylinder which are used for a hydraulic clutch operation system such as a clutch actuator of a vehicle. More specifically, the present invention relates to a technology to absorb or dampen pulsations or undue vibrations in a hydraulic fluid of a hydraulic circuit of the hydraulic clutch operation system.

2. Description of the Related Art

Hydraulic clutch actuators of a vehicle are known for operating a clutch mechanism by way of a clutch master cylinder connected through a conduit to a slave cylinder by a driver of the vehicle. The hydraulic clutch actuators are filled with hydraulic fluid such that, when the piston of the clutch master cylinder is actuated, the slave cylinder which is fastened to a bell housing of the clutch is simultaneously actuated so as to operate a clutch lever or a release fork of the clutch by displacement of the hydraulic fluid from the clutch master cylinder to the slave cylinder through the conduit.

The hydraulic clutch actuator of this type operates the clutch in such a way that, when the driver of the vehicle depresses the clutch pedal, the clutch master cylinder is so actuated that the slave cylinder pushes the clutch lever to disengage the clutch. While when the driver releases the clutch pedal, the slave cylinder releases the clutch lever and therefore the clutch is engaged.

In such operations, the hydraulic clutch actuator is filled with hydraulic oil in high pressure when the clutch master cylinder is actuated by depression of the clutch pedal. While imbalances in the crank shaft of the vehicle engine or engine firing impulses are transmitted to the flywheel which undergoes a swashing movement, the flywheel swashing movement in turn leads to vibrations of the diaphragm spring of the clutch release mechanism, the vibrations of the diaphragm spring are transferred to the release bearing of the clutch, and the vibrations propagate backwardly through the hydraulic fluid in the slave cylinder, through the hydraulic fluid in the conduit interconnecting the slave cylinder and the clutch master cylinder, through the hydraulic fluid in the clutch master cylinder, and then through the clutch master cylinder pushrod to the clutch pedal where they are experienced by the driver as vibrations of the clutch pedal. Such vibrations, which are called herein after "pulsations" make the diver irritated.

Various devices have been proposed in an attempt to attenuate these pulsations. Japanese Examined Utility Model publication No.03-14581 discloses a hydraulic clutch actuator with a pulsation absorbing apparatus, as shown in FIG. 1.

Referring to FIG. 1, the hydraulic clutch actuator includes a clutch master cylinder 120, a reservoir tank 121 integral with the clutch master cylinder 120 to supply the hydraulic fluid to a pressure chamber 122 formed in the clutch master cylinder 120, a pulsation absorbing apparatus 140 integral with the clutch master cylinder 120.

The clutch master cylinder 120 has known parts such as a flange 123 to attachment of the clutch master cylinder 120 to the vehicle, a piston 124 in the chamber 122, a connecting rod 125 to operate the piston 124 by the driver, a return spring 126 of the piston 124, and a check valve 127 connected through a passage 128 with the reservoir tank 121 to allow the supply of hydraulic fluid from the reservoir tank 121 to the chamber 122 while to prevent the hydraulic fluid in the chamber 122 form returning back to the reservoir tank 121.

The pulsation absorbing apparatus 140 has a cylindrical housing 141 perpendicularly projecting downward from the clutch master cylinder 120. The main housing 141 defines a dampening chamber 142 communicated through a passage 143 with the chamber 122 in the clutch master cylinder 120. The cylindrical housing 141 has an absorbing assembly having a piston mechanism 144 perpendicularly reciprocate in the dampening chamber 141, a conical spring 145 urging the piston mechanism 144 to make a space between the passage 145 and the piston cup 144a of the piston mechanisms 144, a first dampening plate 146 contacting the bottom of the piston mechanism 144, a second dampening plate 147 sealing the bottom portion of the main housing 141, screws 148 to fix the second dampening plate 147 to the bottom of the main housing 141, and a damper disc 149 disposed between first and second dampening plates 147 and 148.

In operation, the hydraulic fluid in the pressure chamber 122 of the clutch master cylinder 120 is also filled in the dampening chamber 142. When the pulsations are propagated to the hydraulic fluid, the pulsations transfer to the piston mechanism 144 and are absorbed by deformations of the first and second dampening plates 146 and 147 and the damper disc 149. However, the deforming movements of these members 146, 147, and 149 of the first prior art undergo the undue vibrations of the screws 148. Thus, the screws 148 may loosen in use of the apparatus.

Another prior art, Japanese unexamined patent publication No.2000-2270 is shown in FIGS. 2 and 3.

In the following, substantially equivalent elements are designated by the same reference numerals, and duplicated description thereof will be omitted.

Referring to FIG. 2, a clutch master cylinder 120 has a connecting sleeve 129 perpendicularly projecting downward. The connecting sleeve 129 supports a pulsation dampening apparatus 150 interconnecting the chamber 122 and the dampening chamber 142 through the passage 143.

Referring to FIG. 3, the pulsation dampening apparatus 150 has a joint sleeve 151 which is inserted in the connecting sleeve 129 to attachment of the pulsation dampening apparatus 150, a disc body 152 integrally and coaxially formed with the bottom portion of the joint sleeve 151 to support an absorbing assembly 153 having disc members 154 and 155. The absorbing assembly 153 is attached by a thin flange 156 which is deformed to inner peripheral annular shape by the caulking process.

Because the absorbing assembly 153 is supported by the thin flange 156 in the second prior art, assembling process may be difficult when the caulking process is conducted by a press machine. Furthermore, material of the thin flange 156 must be thin and extensible, so that the material of the disc body 152 may be limited. This makes the pulsation dampening apparatus 150 different parts from the cylinder body of the clutch master cylinder 120. Thus, the assembly process of the pulsation dampening apparatus 150 to the clutch master cylinder 120 would be necessary in this aspect, and therefore the clutch master cylinder 120 of the second prior art would be made in high cost.

SUMMARY OF THE INVENTION

Accordingly, an object of the present invention is to provide a pulsation dampening apparatus and a clutch master cylinder that solve the above mentioned problems in the prior arts.

It is another object of the present invention to provide a pulsation dampening apparatus and a clutch master cylinder that are easy to assemble and are sturdy in structures in low cost.

One aspect of the present invention is a pulsation dampening apparatus used for a hydraulic clutch operation system which has a hydraulic circuit. The apparatus of the present invention has a housing and a dampening assembly accommodated in the housing to alleviate the pulsation. The dampening assembly has a working unit and an elastic retainer. The elastic retainer is preloaded to elastically fasten the working unit. The apparatus has a force conversion mechanism so constructed as to increase the reaction force or spring-back force of the retainer in accordance with a force transmitted from the working unit to the retainer.

Another aspect of the present invention is a clutch master cylinder which integrally includes the pulsation dampening apparatus.

These and other objects, features and advantages of the present invention will become more apparent upon reading the following detailed description and accompanying drawings.

DETAILED DESCRIPTION OF THE PREFERRED EMBODIMENTS

Figure 1:
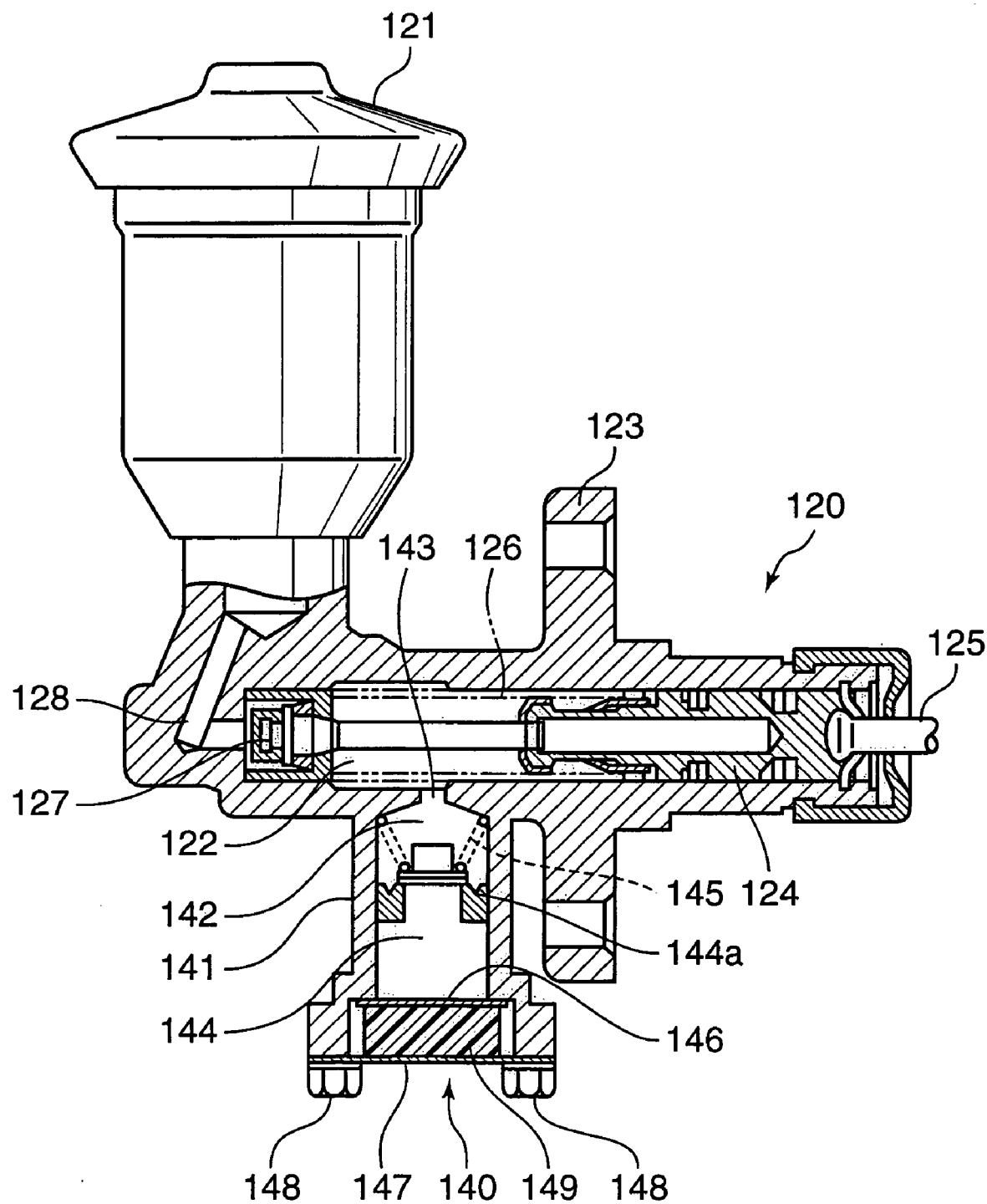
FIG. 1 is a partially sectional view showing a clutch master cylinder of the first prior art.
Figure 2:
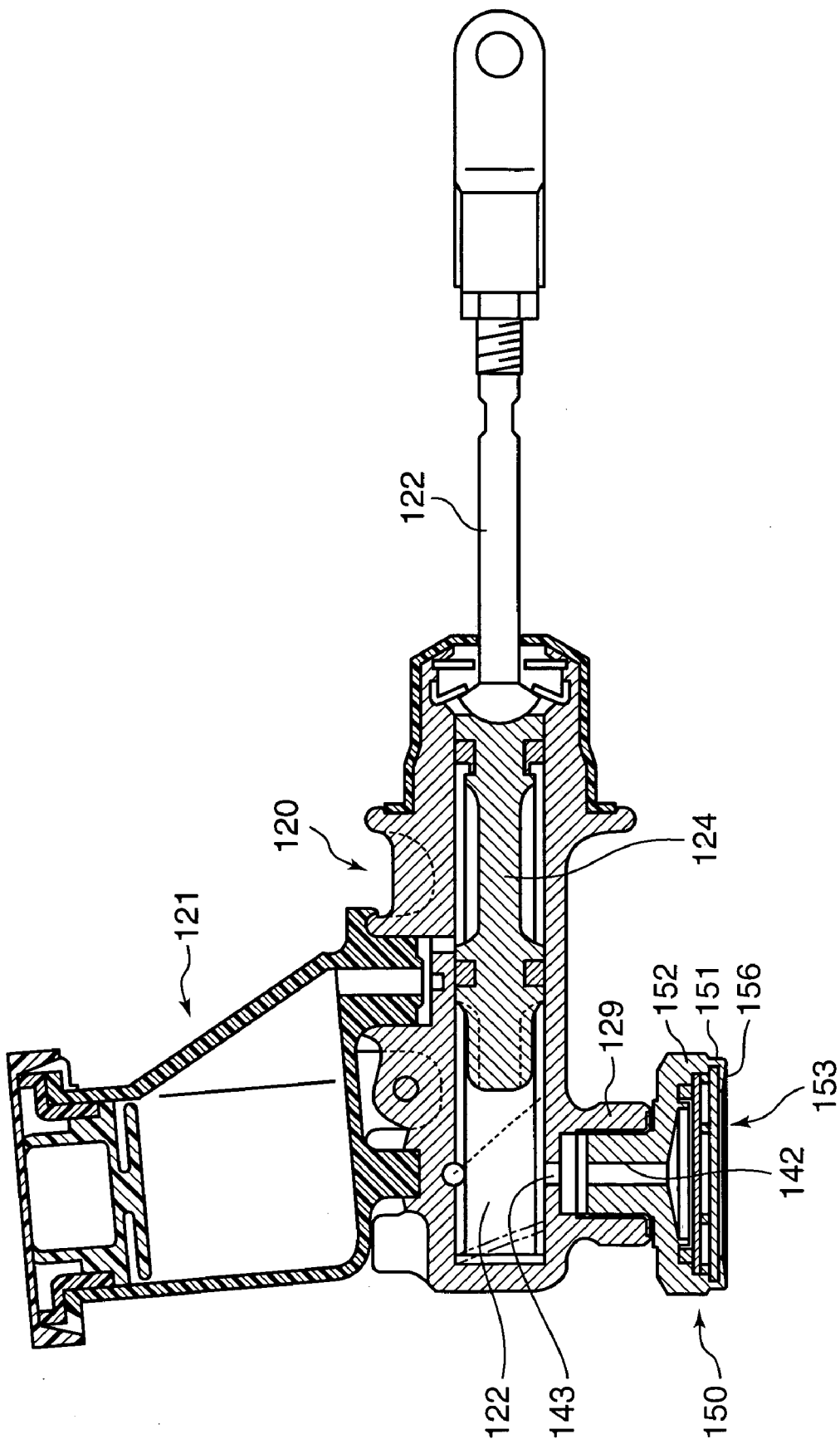
FIG. 2 is a partially sectional view showing a clutch master cylinder of the second prior art.
Figure 3:
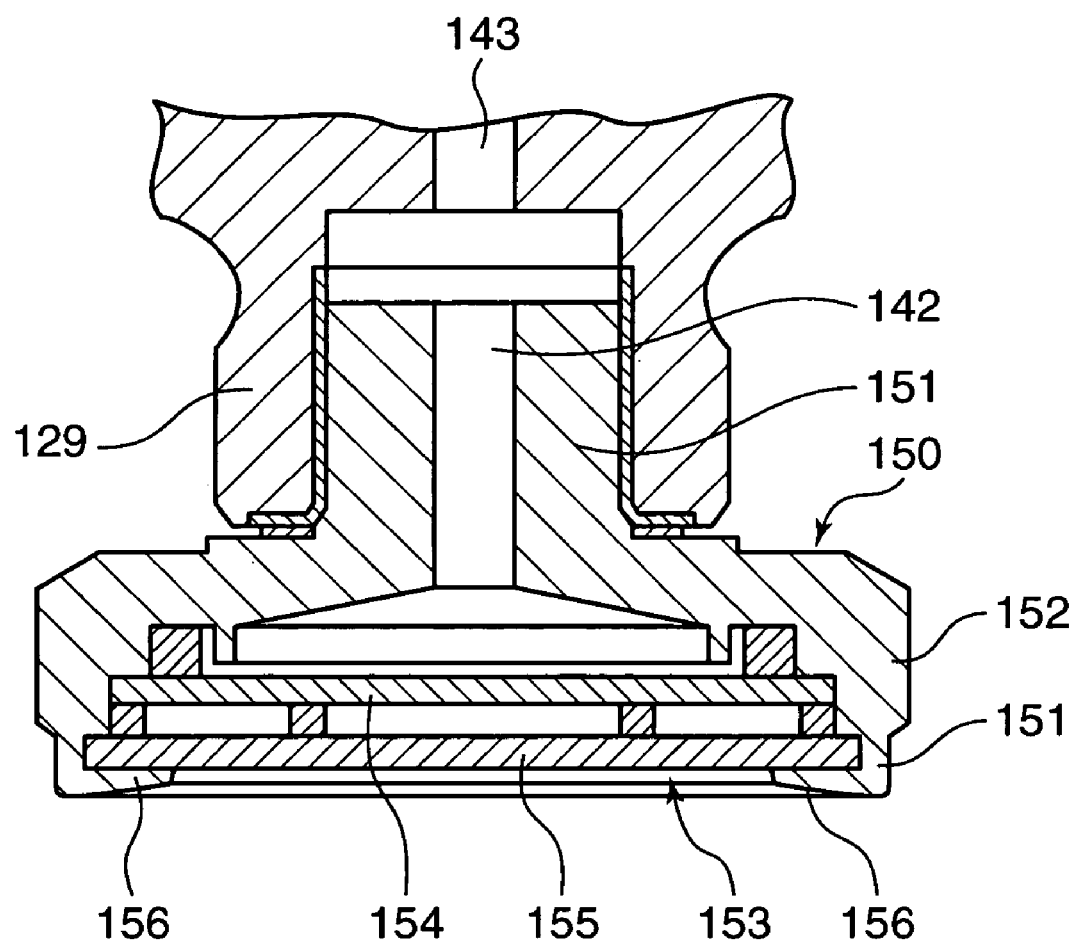
FIG. 3 is a fragmentary elongated sectional view of FIG. 2.
Figure 4:
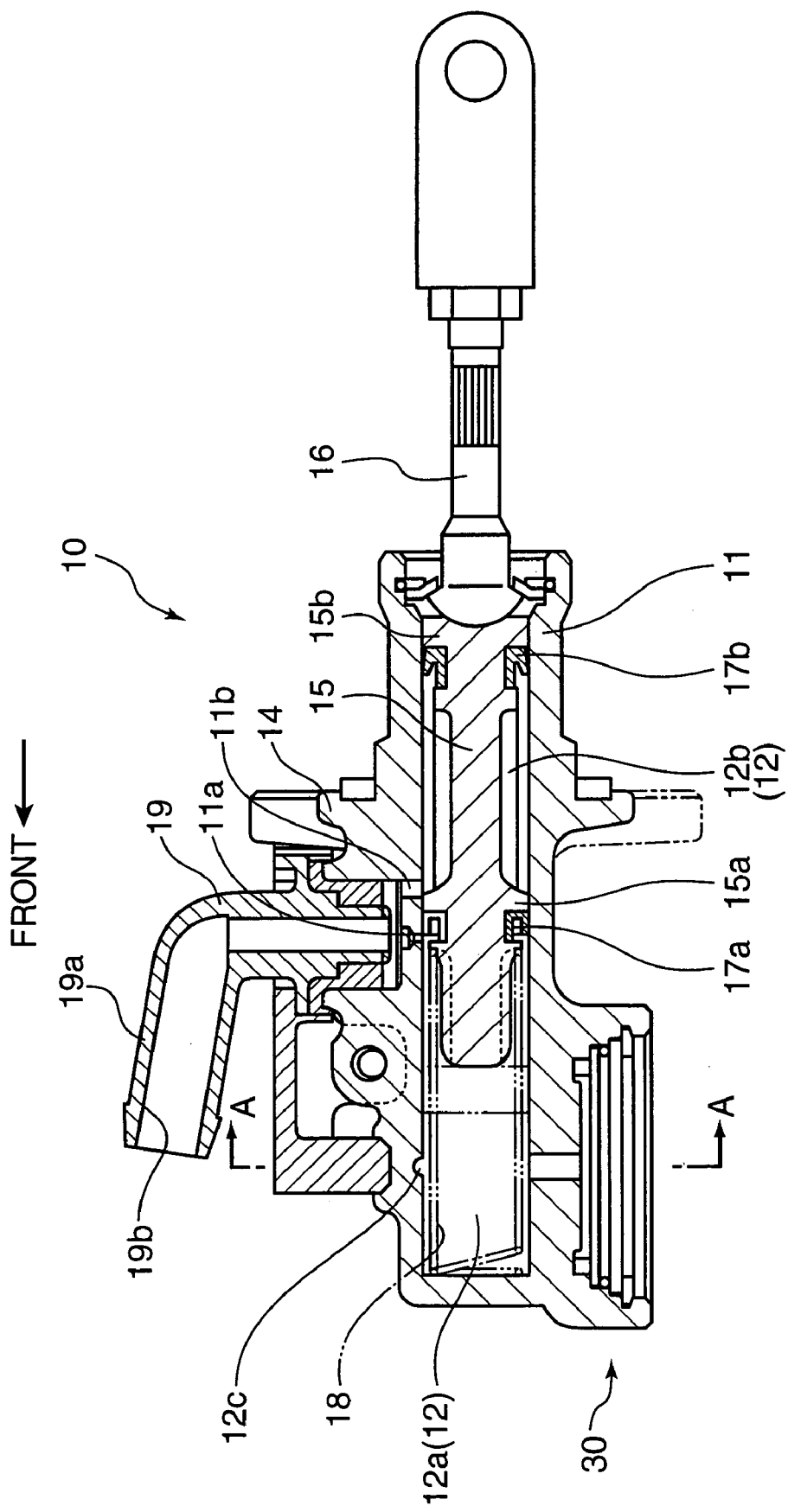
FIG. 4 is a partially sectional view of a clutch master cylinder with a pulsation dampening apparatus in accordance with an embodiment of the present invention.

Referring to FIG. 4, a clutch master cylinder 10 of the present embodiment has a cylinder body 11 which has a substantially sleeve like hollow configuration and has a chamber 12 formed therein. The cylinder body 11 is formed with a flange 14 to attachment of the clutch master cylinder 10 to the vehicle. The cylinder body 11 has a piston 15 slidingly received within the chamber 12 to apply the pressure to the hydraulic fluid in the chamber 12 by reciprocate movement. The piston 15 is connected with a clutch pedal through a connecting rod 16 to operate the piston 15 by the driver. Hereinafter, a front direction is defined as an opposite side to the connecting rod 16 with regard to an axial direction of the piston 15.

The piston 15 has a pair of large diameter portions 15a and 15b in order to partition the chamber 12 into two parts. One of the large diameter portion 15a is formed at an intermediate portion with regard to an axial direction of the piston 15. The other large diameter portion 15b is formed at a rear end part contacting the connecting rod 16. Thus, the intermediate large diameter portion 15a and the front tip therefrom of the piston 15 define a pressure chamber 12a, and the large diameter portion pair 15a and 15b define a supplement chamber 12b, together with inner walls of the chamber 12. The dimension of the supplement chamber 12b is set sufficiently to fill the pressure chamber 12a as described later. The inner walls of the chamber 12 define therein a passage 12c which interconnects the pressure chamber 12a and a slave cylinder.

Both large diameter portions 15a and 15b have annular seals 17a and 17b. The annular seal 17a of the first large diameter portion 15a is formed into U shape in cross section and an outer periphery thereof faces to the front direction. Therefore, the annular seal 17a works as a check valve in such a way that, when the piston 15 moves forwardly, the annular seal 17a prevents the hydraulic fluid from leaking from the pressure chamber 12a to the supplement chamber 12b, while the annular seal 17b allows the hydraulic fluid to flow from the supplement chamber 12b to the pressure chamber 12a after the piston 15 returns backwardly.

The piston 15 is urged backwardly in the chamber 12 by a return spring 18 in the chamber 12. Thus, when the driver releases the clutch pedal, the piston 15 is positioned at the rearmost end of the chamber 12. Mounted on the cylinder body 11 is a joint member 19 through which the hydraulic fluid is supplied from a reservoir tank to the chambers 12a and 12b. The joint member 19 has a nipple 19a to which a conduit is jointed to interconnect a passage 19b of the nipple 19a and an output port of the reservoir tank.

The cylinder body 11 has a pair of ports 11a and 11b, which are respectively named pressure port 11a and supplement port 11b. The pressure port 11a interconnects the outlet of the passage 19b of the joint member 19 and the pressure chamber 12a only when the piston 15 is positioned at rearmost of the chamber 12, as shown in FIG. 4. The supplement port 11b interconnects the outlet of the passage 19b and the supplement chamber 12b regardless of the position of the piston 15.

In operation, when the driver releases the clutch pedal, both pressure and supplement chambers 12a and 12b are filled with the hydraulic fluid from the reservoir tank through the passage 19b of the joint member 19 and through the pressure and supplement ports 11a and 11b. When the driver depresses the clutch pedal, the connecting rod 16 pushes the piston 15 forwardly. The displacement of the piston 15 causes to close the pressure port 11a. The pressure of the hydraulic fluid in the pressure chamber 12a thus rises so that the operation force is transmitted through the passage 12c to the slave cylinder. When the driver releases the clutch pedal from the depressed situation, the piston 15 returns quickly to the rearmost position of the chamber 12 by the urging force of the return spring 18. After this process, the hydraulic fluid in the slave cylinder returns to the reservoir tank and the seal 17a allows hydraulic fluid in the supplement chamber 12b to flow to the pressure chamber 12a at the same time in conventional manner (e.g. Japanese Unexamined Patent Publication No.08-119089). Thus, the pressure chamber 12a is immediately filled with the hydraulic fluid by supply of the supplement chamber 12b.

The clutch master cylinder 10 has a pulsation dampening apparatus 30 integral with the cylinder body 11.

Figure 5:
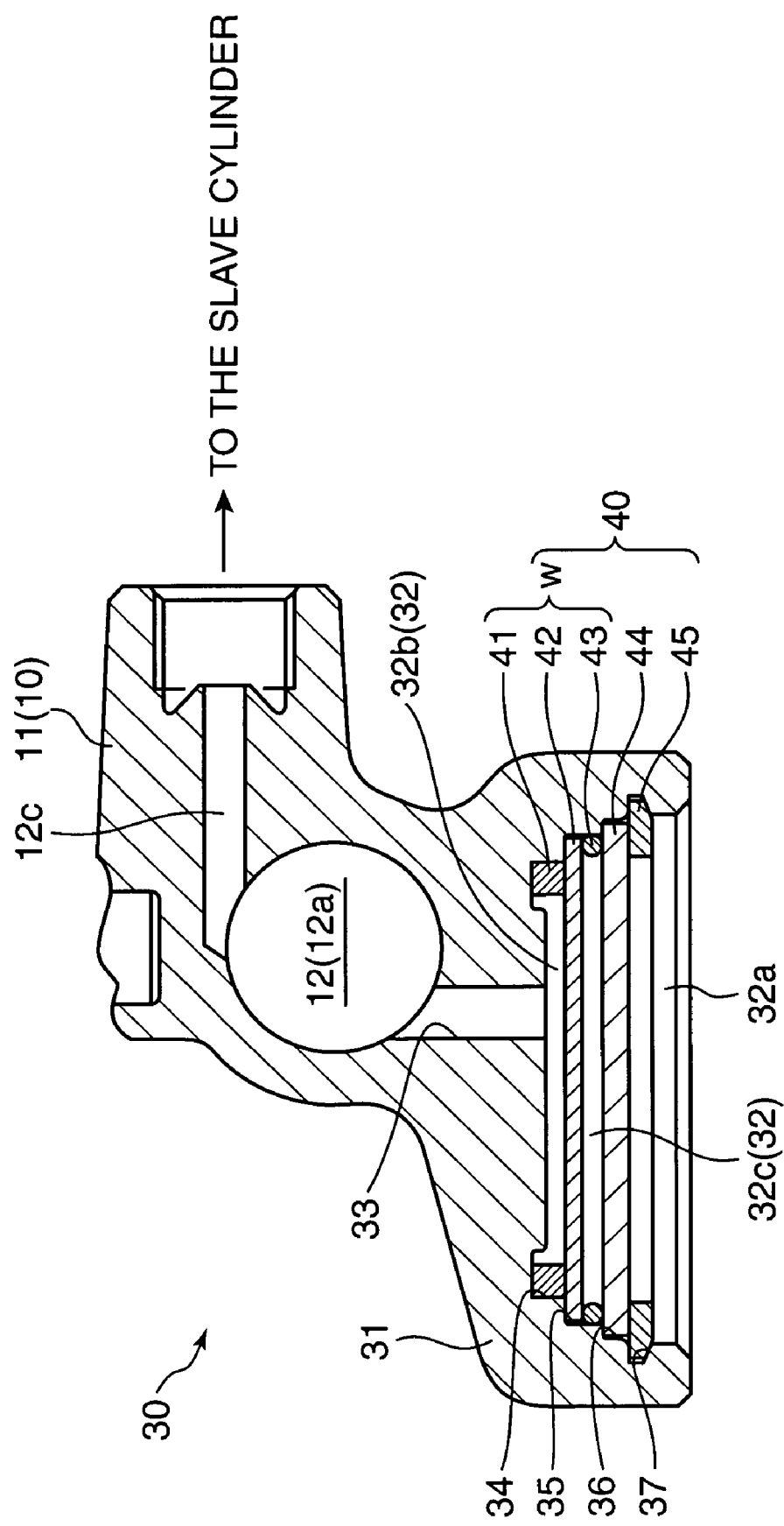
FIG. 5 is a cross sectional view along the broken line A—A in FIG. 4.

Referring now to FIG. 5, the pulsation dampening apparatus 30 has an annular projection 31 formed by cast process integrally with the cylinder body 11. The annular projection or housing 31 projects downward perpendicularly to the cylinder body 11. The housing 31 defines a circular dent 32 in which a dampening assembly 40 is accommodated from an opening 32a formed in the bottom of the housing 31. The circular: dent 32 is connected by a passage 33 with the pressure chamber 12a in the cylinder body 11 so that the dampening assembly 40 accommodated in the circular dent 32 receives directly the pressure and the pulsations of the hydraulic fluid.

Figure 6:
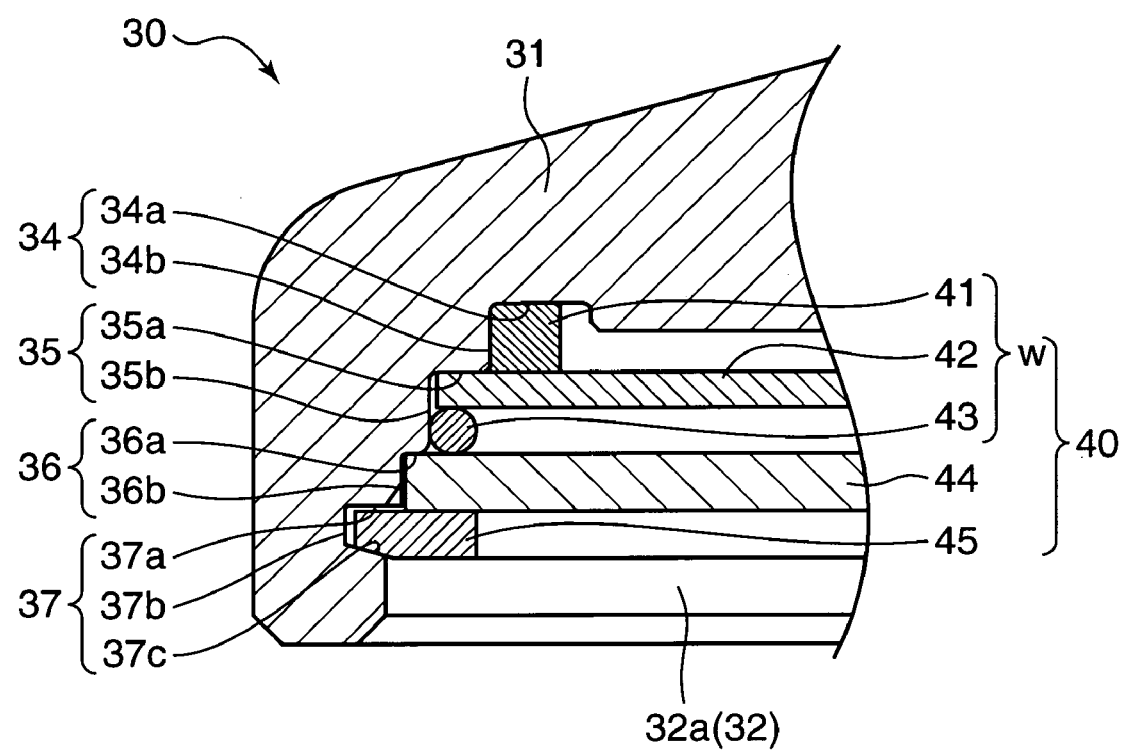
FIG. 6 is a partially elongated view of FIG. 5.

Referring to FIGS. 5 and 6, in order to accommodate the dampening assembly 40 in the circular dent 32, an inner peripheral wall is of stepping configuration which defines a seal part 34 at the top in the circular dent 32, a plate part 35 beneath of the seal part 34 and having a diameter slightly larger than the seal part 34, a support part 36 beneath of the plate part 35 and having a diameter slightly larger than the plate part 35, and an annular groove 37 beneath of the support part 36 and having a diameter slightly larger than the support part 36. The parts 34, 35, and 36 form respectively ceilings 34a, 35a, and 36a and peripheral portions 34b, 35b, and 36b perpendicular to corresponding ceilings 34a, 35a, and 36a. The annular groove 37 has a ceiling 37a, a peripheral portion 37b, and a tapered bottom 37c which inclines axially downwardly with respect to a radially inner part.

Figure 7:
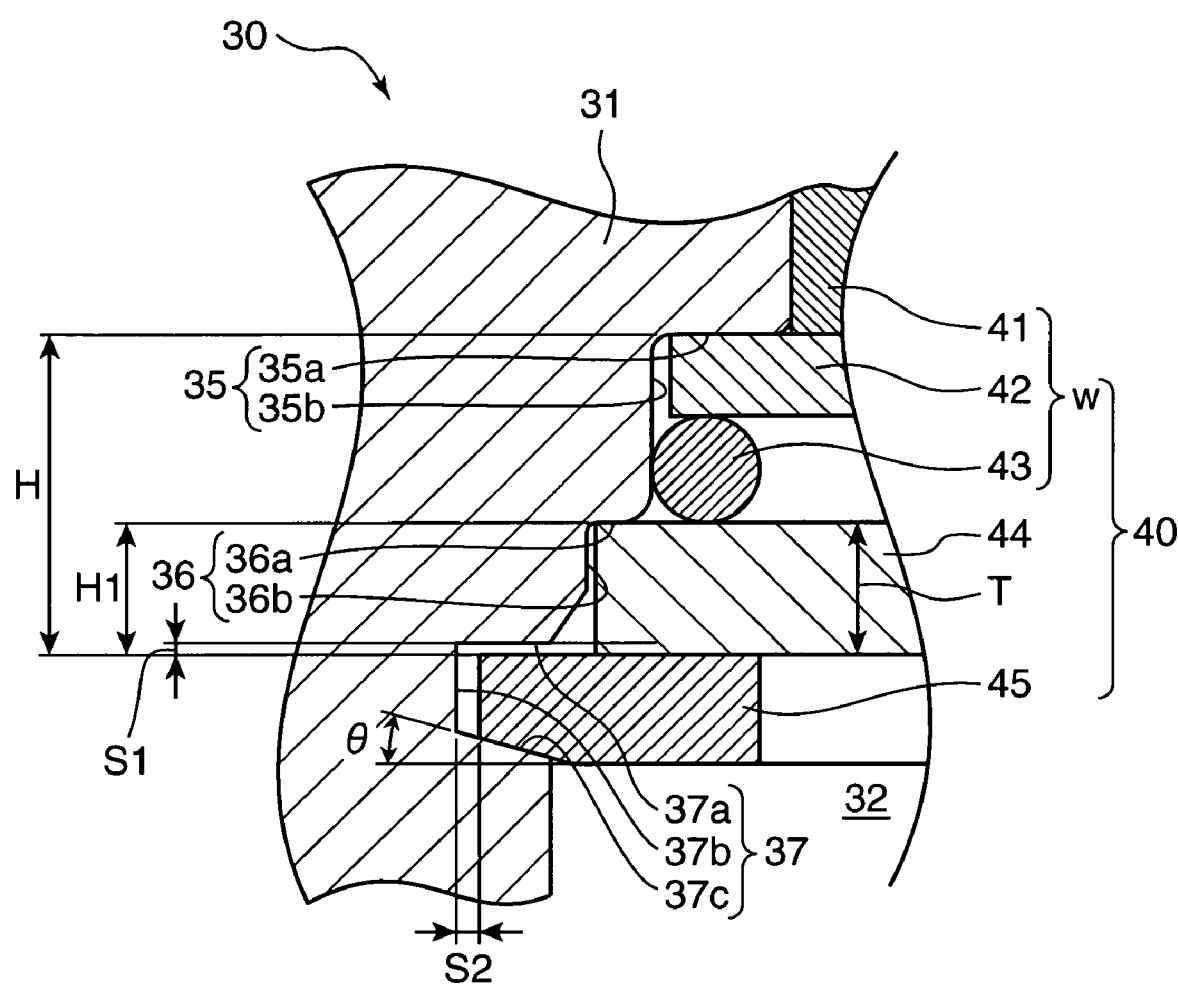
FIG. 7 is a partially elongated sectional view of FIG. 6 in accordance with the embodiment of the present invention showing the dimensional relationship.

Referring now to FIGS. 5, 6, and 7, the dampening assembly 40 comprises an annular seal 41 which fits onto the ceiling 34a and the peripheral part 34b of the seal part 34, a vibration absorbing disc 42 disposed in an upper portion of the plate part 35, a fulcrum ring 43 located beneath of the vibration absorbing disc 42 in a bottom part of the disc part 35, a cover 44 disposed in the support part 36, and an elastic retainer or C shaped retaining ring 45 disposed in the annular groove 37. All the members 41, 42, 43, 44, and 45 are coaxially disposed in the chamber 32 substantially in the present embodiment.

Referring to FIG. 7, the annular seal 41 is made of an elastic material formed in a circular configuration with a rectangular cross section. The annular seal 41 has a sealing function by which the hydraulic fluid from the passage 33 is prevented from leaking beneath the vibration absorbing disc 42. To fulfill this, the annular seal 41 is disposed in such a way that a bottom surface of the annular seal 41 slightly projects from the seal part 34 to the plate part 35 in free state.

The vibration absorbing disc 42 is a disc made of suitable material to absorb the pulsations by vibrating a center part thereof. The outer periphery of the vibration absorbing disc 42 fits on the ceiling 35a by the urging force generated from the C shaped retaining ring 45 upon adhesively urging the annular seal 41. Thus, the annular seal 41 is axially compressed so that the annular seal 41 performs the sealing function. In the present embodiment, the vibration absorbing disc 42 partitions the circular dent 32 into two: a dampening chamber 32b and an accommodate chamber 32c, as shown in FIG. 5. The dampening chamber 32b is defined in an upper part of the circular dent to interconnect through the passage 33 with the pressure chamber 12a. The accommodate chamber 32c is a chamber in which the rest members 43, 44, and 45 are accommodated from the opening 32a. Thus, a top surface of the vibration absorbing disc 42 receives the pressure of the hydraulic fluid through an opening of the annular seal 41 while the annular seal 41 prevents the hydraulic fluid from leaking from the dampening chamber 32b.

The fulcrum ring 43 is an annular member which contacts a bottom of the vibration absorbing disc 42 so that the center of the vibration absorbing disc 42 turns up and down on the fulcrum ring 43 when the vibration absorbing disc 42 receives the vibrations or pulsations of hydraulic fluid in the dampening chamber 32b. The diameter of the fulcrum ring 43 is set to an ample length to pinch the outer periphery of the vibration absorbing disc 42 between the fulcrum ring 43 and the ceiling 35a. Thus, the vibration absorbing disc 42 performs the vibration absorbing function as described above. In the present embodiment, the fulcrum ring 43 is disposed in such a way that an outer periphery of the fulcrum ring 43 fits onto the peripheral portion 35b of the disc part 35 or inner wall of the circular dent 32. Thus, the ceiling 35a and the fulcrum ring 43 function as clamp means for clamping the outer periphery of the vibration absorbing disc 42 in the present embodiment. The material of the fulcrum ring 43 is a rigid member, provided that the fulcrum ring 43 functions as an annular fulcrum. Preferably, the fulcrum ring 43 is made of a metallic material such as a steel wire being marketed, formed in a circle configuration with a circle cross section. The fulcrum ring 43 sits on the cover 44 beneath thereof.

The cover 44 is a relatively stiff metallic material, preferably a stainless steel in the present embodiment so that the urging force from the C shaped retaining ring 45 transmits to the fulcrum ring 43 ample to pinch the vibration absorbing disc 42 with the ceiling 35a. The diameter of the cover 44 is set to an ample length to fit the outer periphery of the cover 44 onto the ceiling 36a upon urging the fulcrum ring 43 upwardly. To fulfill this, the thickness T of the cover 44 is set to the length higher than the height H1 of the support part 36 by a clearance S1. In the present embodiment, the cover 44 prevents water or dust from leaking from the inner side of the vibration absorbing disc 42. In another embodiment, the cover 45 can be omitted, provided that the urging force can be transmitted from the C shaped retaining ring 45.

Figure 8:
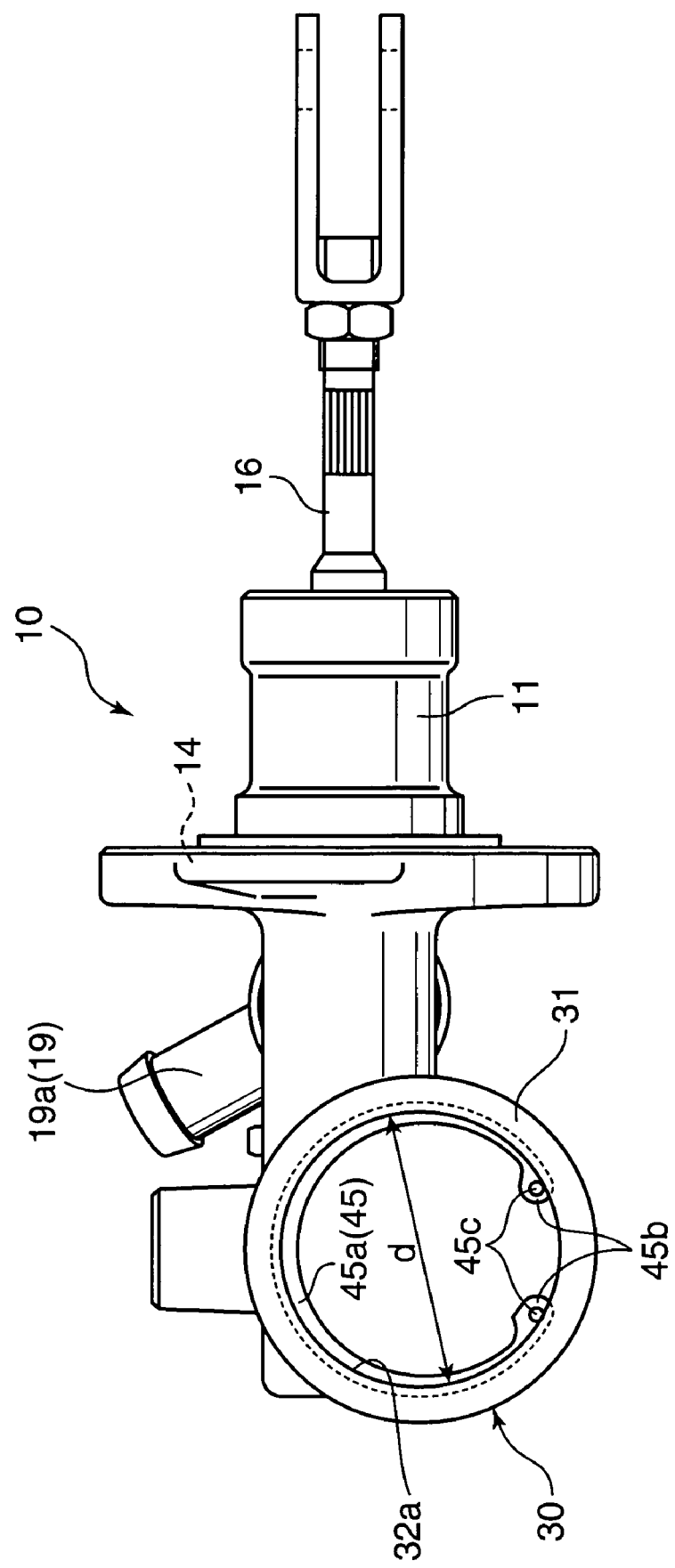
FIG. 8 is a bottom view in accordance with the embodiment of the present invention.
Figure 9:
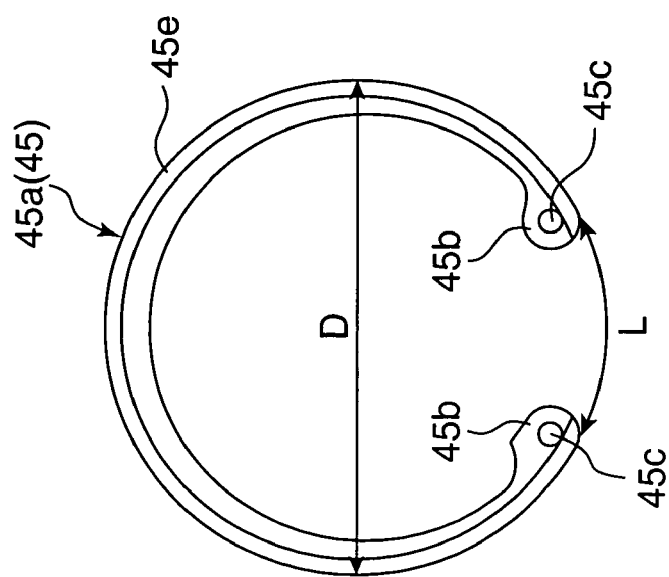
FIG. 9 is a bottom view of a C shaped ring in accordance with the embodiment of the present invention.

Referring now FIGS. 8 and 9, the C shaped retaining ring 45 includes integrally a C shaped part 45a and a pair of ends 45b at the tip of the C shaped part 45a. The ends 45b form respectively holes 45c therein.

Figure 11:
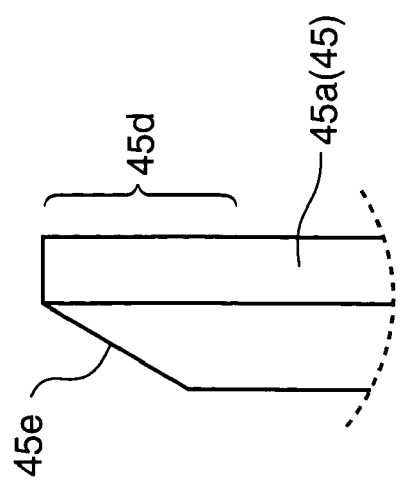
FIG. 11 is a partially elongated view of FIG. 10.
Figure 10:
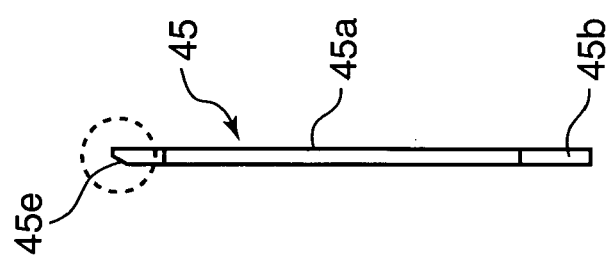
FIG. 10 is a side view of a C shaped ring of FIG. 9.

Referring to FIGS. 10 and 11, the C shaped retaining ring 45 is made of a relatively stiff yet elastic material such as spring steels so that the C shaped part 45a shrinks the diameter elastically by the force urging the both ends 45b to close to each other, upon returning back to the same diameter when the application of the force is released. An outer diameter D of the C shaped part 45a in free conditions is set suitable for an outer periphery 45d of the C shaped part 45a to fit into the groove part 37. A circular distance L between the ends 45b along the outer periphery 45d of the C shaped part 45a is set for the C shaped part 45a to shrink the diameter D a little smaller than an inner diameter d of the opening 32a.

Referring to FIGS. 7, 9, 10, and 11, the C shaped part 45 has a chamfer 45e at a bottom of the outer periphery 45d. An angle θ (FIG. 7) of the chamfer 45e from the bottom is set suitable for the chamfer 45e to abut with the tapered bottom 37c of the groove 37. As the result, the tapered bottom 37c and the chamfer 45e work as cam surfaces of a force conversion mechanism to push the bottom surface of the cover 44 upwardly so that the vibration absorbing disc 42 compresses the annular seal 41 until the vibration absorbing disc 42 contacts the ceiling 34a by receiving the urging force from the C shaped retaining ring 45 through the cover 44 and the fulcrum ring 43.

In an assemble process of the dampening assembly 40, the annular seal 41, the vibration absorbing disc 42, the fulcrum ring 43, the cover 44, and the C shaped retaining ring 45 are disposed from the opening 32a within the housing 31 in this order. To insert the C shaped retaining ring 45 in the groove 37, an operator uses a suitable jig, which is able to insert the holes 45c of the ends 45b in order to close the ends 45b of the C shaped retaining ring 45. The operation causes to shrink the C shaped retaining ring 45. Then the operator inserts the shrunken ring 45 into the opening 32a of the circular dent 32. After inserting the shrunken ring 45 into the opening 32a, the operator releases the jig from the holes 45c of the ends 45b, so the C shaped retaining ring 45 expands and the outer periphery 45d of the C shaped part 45a fits into the groove 37. In this process, the chamfer 45e which abuts with the tapered bottom 37c slides radially outwardly on the tapered bottom 37c, so that the spring force of the C shaped part 45a of the C shaped retaining ring 45 turns to the urging force which axially upwardly urges the cover 44. The urging force will transmit through the fulcrum ring 43 to the outer periphery of the vibration absorbing disc 42. Thus, the vibration absorbing disc 42 is fastened by the fulcrum ring 43 and the ceiling 35a of the disc part 35 upon allowing the center thereof to turn up and down while compressing the annular seal 41 to prevent the hydraulic fluid in the circular dent 32 from leaking to beneath of the vibration absorbing disc 42.

In the present embodiment, a working unit W is constituted by the seal 41, the vibration absorbing disc 42, and the fulcrum ring 43. In order to urge the working unit W and the cover 43 preferably, the total height H thereof in assemble condition shown in FIG. 7 is determined to preload the C shaped retaining ring 45. To assure the further expansion of the preloaded C shaped retaining ring 45, the height H is also determined to remain a radial clearance S2 between the preloaded C shaped retaining ring 45 and the peripheral portion 37b of the groove 37.

As explained above, employing the C shaped retaining ring 45, the assemble process can be conducted by simple operations. Furthermore, because the C shaped retaining ring 45 remains the potential to expand the diameter D thereof in the assemble state, the force conversion mechanism embodied by the tapered bottom 37c and the chamfer 45e functions to urge the cover 44 upwardly. Thus, the C shaped retaining ring 45 always maintains adhesive state with the bottom of the cover 44 to urge the vibration absorbing disc 42 through intermediate members 43 and 44 even if vibrations caused by the vehicle or some other reason is transmitted to the pulsation dampening apparatus 30. In another embodiment in which the cover 44 is omitted, the above mentioned functions can also attain by contacting the C shaped retaining ring 45 with the fulcrum ring 43 directly remaining the potential to expand the diameter of the C shaped retaining ring 45.

In the present embodiment, because the C shaped retaining ring 45 is a member separate from the housing 31, the limitation on materials of the housing 31 can be overcome. Consequently, the housing 31 can be integrally formed with the cylinder body 11 of the clutch master cylinder 10. In case the housing 31 is formed by cast process integrally with the cylinder body 11, the assemble process can also be simplified as the joint process of the housing 31 to the cylinder body 11 can be omitted.

In the present embodiment, on the other hand, because the C shaped retaining ring 45 functions as the force conversion mechanism by which the spring force of the C shaped part 45a turns to the urging force, the C shaped retaining ring 45 maintains the urging force even when the housing 31 receives vibrations and does not loose like a screw in the prior art.

In the present embodiment, the tapered bottom 37c and the chamfer 45e abut with each other over the surfaces thereof. The tapered bottom 37c and the chamfer 45e function as a guide for guiding expanding of the C shaped retaining ring 45 when the C shaped retaining ring 45 expands. Also, when the working unit W exerts a force against the C shaped retaining ring 45, the tapered bottom 37c and the chamfer 45e function as a structure for receiving a pressing force at a wide surface area stably, compared with the case that one of the two members 37c and 45e is contacted against the other of the two members with a small or less contact area.

In the present embodiment, since the fulcrum ring 43 is designed in circular configuration with a circular cross section, cutting processes such as shaping is unnecessary. Because marketed wires are available from a simple process of mass production, it is also easy to embody the fulcrum ring 43 by a steel wire being marketed. Thus, the fulcrum ring 43 of the present embodiment is cheap and of high accuracy. In manufacturing process of the fulcrum ring 43, complicated calibration is also unnecessary.

In the present invention, because the fulcrum ring 43 and the cover 44 are disposed in this order to fasten the vibration absorbing disc 42, a center portion of the cover 44 can restrict the vibrations of the vibration absorbing disc 42. Thus, the holding state of the vibration absorbing disc 42 is made stable.

In the present invention, the cover 44 is made of a stiff metallic material with a certain thickness. The thickness is, however, can set in various sizes, provided that the C shaped retaining ring 45 can urge the bottom of the cover 44 upwardly by the cam functions of the tapered bottom 37c and the chamfer 45e. In other words, the strict calibration of the thickness is unnecessary and therefore the number of production processes can be reduced, provided that the cover 44 is not too heavy. The cover 45 can also be made of various material as far as the cover 45 can support the fulcrum ring 43 or can transmit the urging force from the C shaped retaining ring 45 to the fulcrum ring 43.

In the present embodiment, because the fulcrum ring 43 provides an annularly liner fulcrum for the vibration absorbing disc 42, positioning can be accurate. Thus, vibration-absorbing performance of the disc 42 can be stable.

In another embodiment, the force conversion mechanism can be modified by omitting either of cam surfaces. Namely, either one of the tapered bottom 37c or the chamfer 45e can be omitted, provided that the groove 37 and the C shaped retaining ring 45 play a role as the force conversion mechanism as aforementioned. Specifically, the bottom of the groove 37 may be flat or may be parallel with the ceiling 37a. In this modification, the chamfer 45e of the shrunken C shaped retaining ring 45 will contact with an edge of the bottom of the groove 37 so that the reaction force of the C shaped part 45a will be turned to the urging force. A combination in which a stopper ring, having no chamfer, comes contact with the tapered bottom 37c can be employed. In the later modification, shape of the cross section of the C shaped retaining ring 45 can be varied such as a rectangular or circle shape. Thus, the operator does not need to check the chamfer side of the C shaped retaining ring 45 in the assemble process. Therefore, the assemble process can be easy and develops high efficiency.

Figure 12:
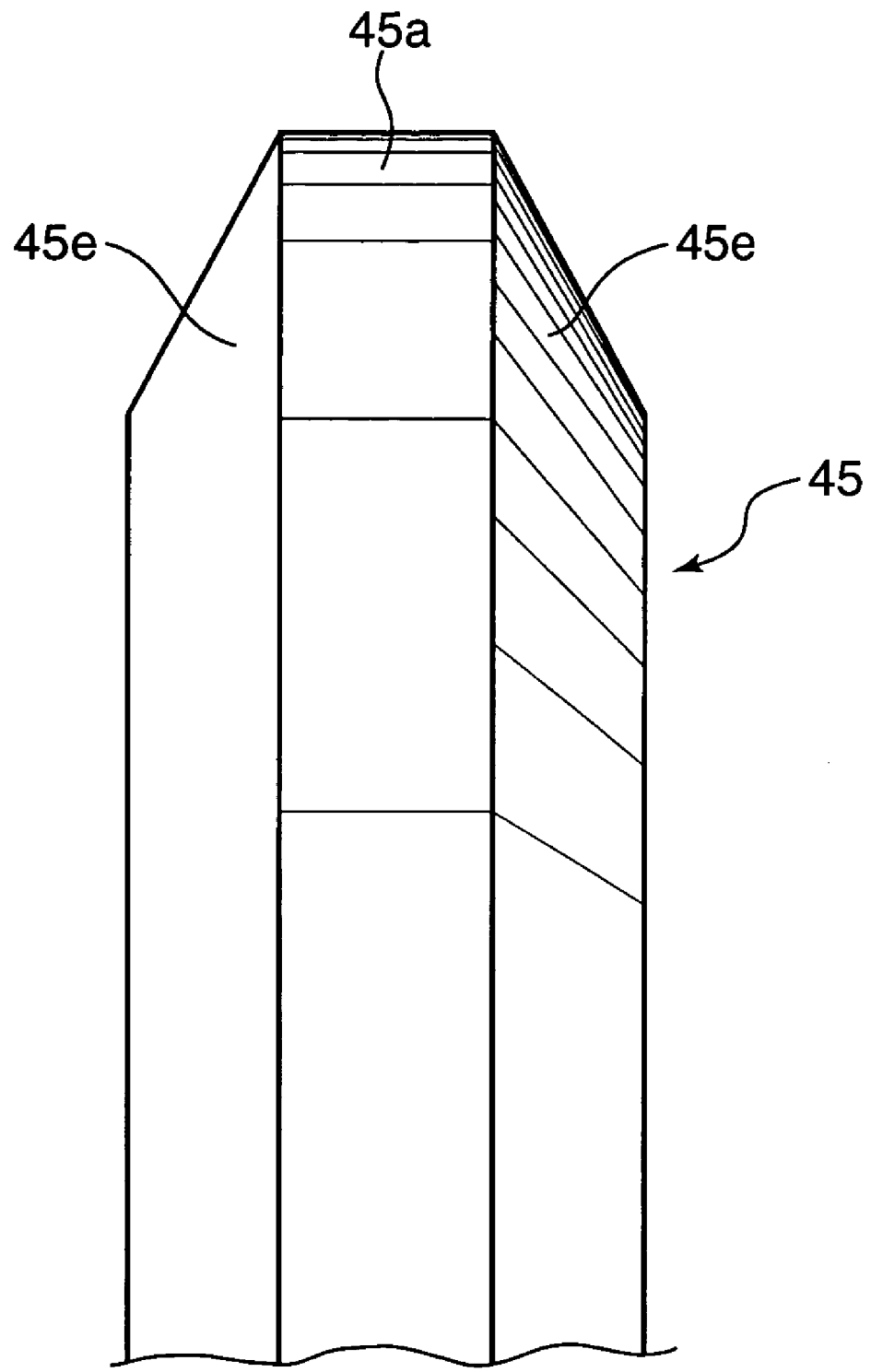
FIG. 12 is a partially elongated view of a C shaped ring in accordance with another embodiment.
Figure 13:
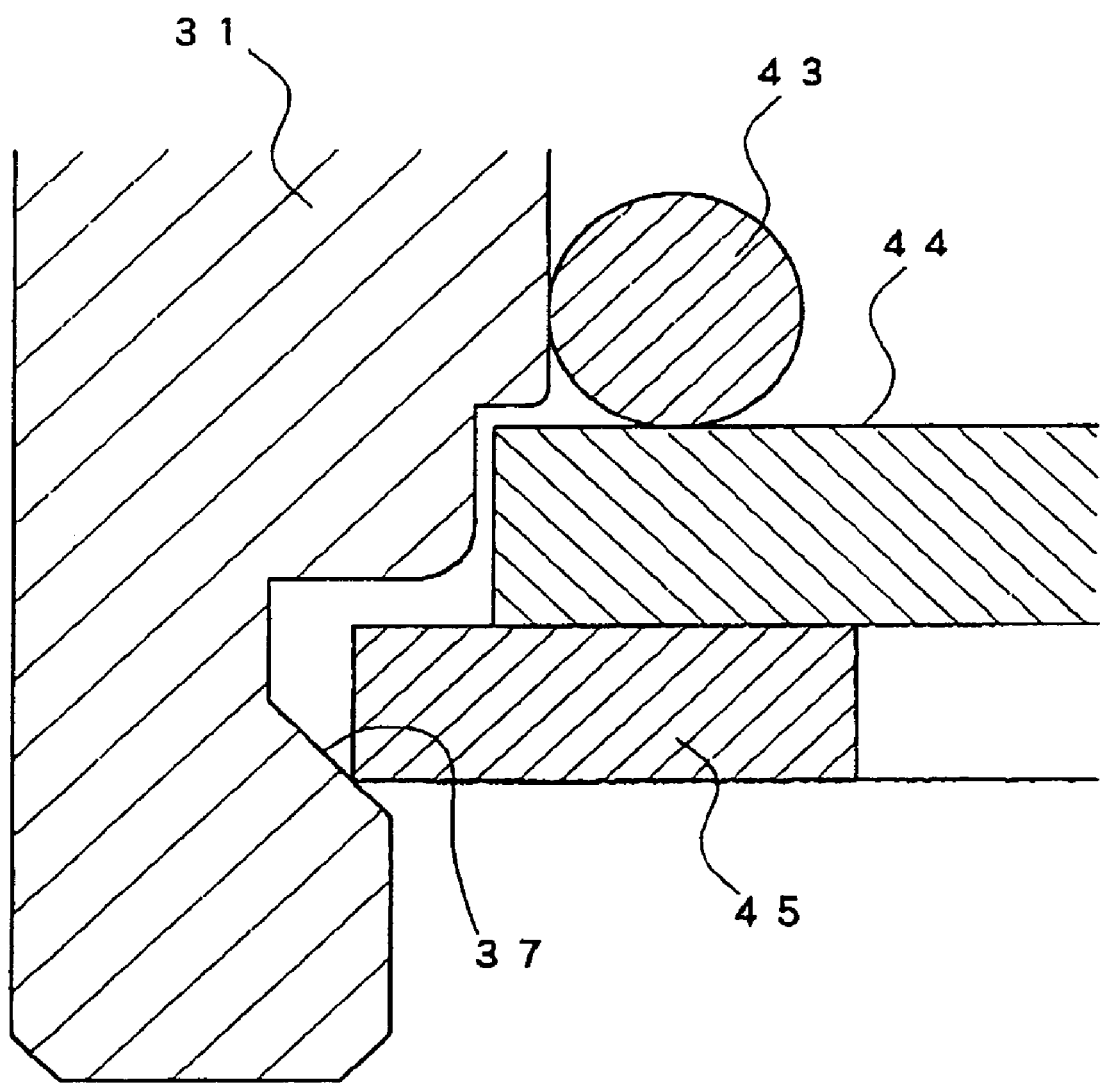
FIG. 13 is a cross-sectional view similar to FIG. 7, but showing another embodiment.

The chamfer 45e may be formed on both sides of the C shaped part 45a, as shown in FIG. 12. Alternatively, the chamfer may be formed only on the bottom of the groove 37 as shown in FIG. 13.

This application is based on Japanese patent application serial No.2003-070166, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A pulsation dampening apparatus used for a hydraulic clutch operation system which has a hydraulic circuit comprising:
    a housing which has a dampening chamber interposed in the hydraulic circuit;
    a dampening assembly accommodated in the housing, said dampening assembly including:
        a working unit having a vibration dampening member substantially adjacent the dampening chamber for alleviating pulsations generated in hydraulic fluid in the dampening chamber and a circular fulcrum at an outer periphery of the vibration dampening member and on a side of the vibration dampening member opposite the dampening chamber so that portions of the vibration dampening member inward of the outer periphery can deform into areas inward of the circular fulcrum, and
        an elastic retainer on a side of the working unit opposite the dampening chamber, the elastic retainer being elastically preloaded from its free state to retain the working unit in the housing; and
    a force conversion mechanism which converts a spring-back force of the elastic retainer in said preloaded state to urge the circular fulcrum of the working unit elastically against the vibration dampening member and towards the dampening chamber.

2. A pulsation dampening apparatus according to claim 1, wherein said elastic retainer is a C shaped retaining ring mounted in an annular groove formed in the housing.

3. A pulsation dampening apparatus according to claim 2, wherein said force conversion mechanism has a cam surface by which the spring-back force of the elastic retainer in said preloaded state is converted to the force acting for urging the working unit towards the dampening chamber, said cam surface of the force conversion mechanism is formed only on the groove in the housing.

4. A pulsation dampening apparatus according to claim 2, wherein said force conversion mechanism has a cam surface by which the spring-back force of the elastic retainer in said preloaded state is converted to the force acting for urging the working unit towards the dampening chamber, said C shaped retaining ring and the groove of the housing have respectively the cam surfaces which abut with each other in assemble condition.

5. A pulsation dampening apparatus according to claim 2, wherein said force conversion mechanism has a cam surface by which the spring-back force of the elastic retainer in said preloaded state is converted to the force acting for urging the working unit towards the dampening chamber, said C shaped retaining ring has slopes chamfered on both outer peripheral sides.

6. A pulsation dampening apparatus according to claim 1, wherein said dampening assembly includes a cover between the fulcrum and the elastic retainer.

7. A pulsation dampening apparatus according to claim 1, wherein said working unit includes a seal member which elastically adhesively seals the dampening chamber to prevent the hydraulic fluid from leaking from the dampening chamber.

8. A pulsation dampening apparatus according to claim 1, wherein said working unit includes a cover member disposed between the fulcrum member and the elastic retainer so that the urging force of the elastic retainer is transmitted to the fulcrum ring.

9. A clutch master cylinder used for a hydraulic clutch operation system which has a hydraulic circuit comprising:
    a cylinder body having a pressure chamber interposed in the hydraulic circuit; and
    a pulsation dampening apparatus, said pulsation dampening apparatus including:
        a housing integrally formed with the cylinder body, said housing having a dampening chamber interconnected with the pressure chamber;
        a working unit having a vibration dampening member substantially adjacent the dampening chamber for absorbing pulsations generated in hydraulic fluid in the dampening chamber and a circular fulcrum at an outer periphery with the vibration dampening member and on a side of the vibration dampening member opposite the dampening chamber so that portions of the vibration dampening member inward of the outer periphery can deform into areas inward of the circular fulcrum, and
        an elastic retainer on a side of the working unit opposite the dampening chamber, the elastic retainer being elastically preloaded so disposed as to be elastically from its free state to retain the working unit in the housing; and
    a force conversion mechanism which converts a spring-back force of the elastic retainer in said preloaded state to urge the circular fulcrum of the working unit elastically against the vibration dampening member and towards the dampening chamber.

10. A clutch master cylinder according to claim 9, wherein said elastic retainer is a C shaped retaining ring mounted in an annular groove formed in the housing.

11. A clutch master cylinder according to claim 10, wherein said force conversion mechanism has a cam surface by which the spring-back force of the elastic retainer in said preloaded state is converted to the force acting for urging the working unit towards the dampening chamber, said cam surface of the force conversion mechanism is formed only on the groove in the housing.

12. A clutch master cylinder according to claim 10, wherein said force conversion mechanism has a cam surface by which the spring-back force of the elastic retainer in said preloaded state is converted to the force acting for urging the working unit towards the dampening chamber, said C shaped retaining ring and the groove of the housing have respectively the cam surfaces which abut with each other in assemble condition.

13. A clutch master cylinder according to claim 10, wherein said force conversion mechanism has a cam surface by which the spring-back force of the elastic retainer in said preloaded state is converted to the force acting for urging the working unit towards the dampening chamber, said C shaped retaining ring has slopes chamfered on both outer peripheral sides.

14. A clutch master cylinder according to claim 9, wherein said dampening assembly includes a cover between the fulcrum and the elastic retainer.

15. A clutch master cylinder according to claim 9, wherein said working unit includes a seal member which elastically adhesively seals the dampening chamber to prevent the hydraulic fluid from leaking from the dampening chamber.

16. A clutch master cylinder according to claim 9, wherein said working unit includes a cover member disposed between the fulcrum member and the elastic retainer so that the urging force of the elastic retainer is transmitted to the fulcrum ring.

* * * * *